United States Patent
Sargeant et al.

(10) Patent No.: US 10,131,122 B2
(45) Date of Patent: Nov. 20, 2018

(54) FORMABLE FILMS, LAMINATE STRUCTURES, AND RELATED METHODS

(71) Applicant: Flex Films (USA) Inc., Elizabethtown, KY (US)

(72) Inventors: Steven Sargeant, Elizabethtown, KY (US); Sudhir Naik, Noida (IN); Pramod Sirsamkar, Noida (IN); Rohan Nair, Elizabethtown, KY (US); J.K. Sharma, Noida (IN); Krishna Kant Sharma, Elizabethtown, KY (US); David Ortiz Grob, Elizabethtown, KY (US)

(73) Assignee: FLEX FILMS (USA) INC., Elizabethtown, KY (US)

( * ) Notice: Subject to any disclaimer, the term of this patent is extended or adjusted under 35 U.S.C. 154(b) by 140 days.

(21) Appl. No.: 15/185,987

(22) Filed: Jun. 17, 2016

(65) Prior Publication Data
US 2016/0368252 A1 Dec. 22, 2016

Related U.S. Application Data

(60) Provisional application No. 62/181,631, filed on Jun. 18, 2015, provisional application No. 62/183,466, filed on Jun. 23, 2015.

(51) Int. Cl.
| | |
|---|---|
| *B32B 27/00* | (2006.01) |
| *B32B 27/36* | (2006.01) |
| *B32B 27/06* | (2006.01) |
| *B32B 7/12* | (2006.01) |
| *B29C 55/12* | (2006.01) |
| *B29C 71/00* | (2006.01) |
| *B29C 71/02* | (2006.01) |
| *B29K 67/00* | (2006.01) |
| *B29L 9/00* | (2006.01) |
| *B29L 31/00* | (2006.01) |
| *B29C 51/00* | (2006.01) |
| *B29K 305/02* | (2006.01) |
| *B29C 51/14* | (2006.01) |
| *B29C 51/26* | (2006.01) |

(52) U.S. Cl.
CPC ........... *B32B 27/36* (2013.01); *B29C 55/12* (2013.01); *B29C 71/0063* (2013.01); *B32B 7/12* (2013.01); *B32B 27/06* (2013.01); *B29C 51/002* (2013.01); *B29C 51/14* (2013.01); *B29C 51/266* (2013.01); *B29C 71/02* (2013.01); *B29C 2793/009* (2013.01); *B29K 2067/003* (2013.01); *B29K 2305/02* (2013.01); *B29K 2995/005* (2013.01); *B29K 2995/0053* (2013.01); *B29L 2009/00* (2013.01); *B29L 2031/712* (2013.01); *B29L 2031/7164* (2013.01); *B32B 2307/518* (2013.01); *B32B 2367/00* (2013.01)

(58) Field of Classification Search
None
See application file for complete search history.

(56) References Cited

U.S. PATENT DOCUMENTS

| | | |
|---|---|---|
| 3,496,143 A | 2/1970 | Siggel et al. |
| 4,073,857 A | 2/1978 | Arakawa |
| 4,468,426 A | 8/1984 | Hatchadoorian et al. |
| 4,537,312 A | 8/1985 | Intini |
| 4,839,127 A | 6/1989 | Ajmera et al. |
| 5,424,121 A | 6/1995 | Murakami et al. |
| 6,270,874 B1 | 8/2001 | Iwashita et al. |
| 6,315,967 B1 | 11/2001 | Potter et al. |
| 6,902,818 B2 | 6/2005 | Murschall et al. |
| 7,128,969 B2 | 10/2006 | Busch et al. |
| 2003/0170479 A1 | 9/2003 | Peiffer et al. |
| 2004/0026827 A1 | 2/2004 | Dairanieh et al. |
| 2014/0335402 A1 | 11/2014 | Minamibori |

OTHER PUBLICATIONS

Munstedt, et al., "Importance of elongational properties of polymer melts for film blowing and thermoforming," Polymer Engineering & Science vol. 46, Issue 9, pp. 1190-1195, Sep. 2006.
Korean Intellectual Property Office, International Search Report issued in corresponding Application No. PCT/US2016/038129, dated Sep. 29, 2016.

*Primary Examiner* — Ana L. Woodward
(74) *Attorney, Agent, or Firm* — Birch, Stewart, Kolasch & Birch, LLP

(57) ABSTRACT

Formable films are provided that include one or more biaxially-oriented polyethylene terephthalate layers. The formable films include a metaphase with a metaphase transition of about 180° C. to 200° C. as measured by differential scanning calorimetry (DSC). The formable films further include a molded volume of greater than 200%. Laminate structures including the formable films and processes for producing and using the formable films and laminate structures are also provided.

27 Claims, 3 Drawing Sheets

FORMABLE FILMS, LAMINATE STRUCTURES, AND RELATED METHODS

RELATED APPLICATIONS

This application claims priority from U.S. Provisional Application Ser. No. 62/181,631, filed Jun. 18, 2015, and U.S. Provisional Application Ser. No. 62/183,466, filed Jun. 23, 2015, the entire disclosures of which are incorporated herein by this reference.

TECHNICAL FIELD

The presently-disclosed subject matter relates to formable films, laminate structures including the formable films, and processes for producing and using the formable films and laminate structures. In particular, the presently-disclosed subject matter relates to biaxially-oriented polyethylene terephthalate (PET) films that are capable of thermoforming or cold-forming, laminate structures including such PET films, and methods of making and using the formable PET films and laminate structures.

BACKGROUND

The flexible packaging of foodstuffs, medical products, industrial goods, and the like is a growing and important area of commerce. The creation of flexible packaging materials is usually a multi-step process. Converters, or the producers of flexible packaging films, are companies that typically initially print flexible films, laminate, slit and supply the flexible web stock to an end-user. Such web stocks are then chosen for printability, barrier properties, clarity, scuff resistance, heat-sealability, and several other technical and cost considerations for use in the final product. The web stocks, after creation and selection, are then further processed on a product packaging line to create a pouch, bag, tray, lid, or similar structure at the point of use. That creation of the end-use package subsequently allows for an increased freshness or shelf-life extension for many commodities. Indeed, it is a goal within the industry to increase shelf-stability for a range of food and medical materials, while also presenting an appealing packaged product to the consumer.

In this regard, within the flexible packaging area, there is often a need to create formable structures from a flat web. The creation of a well, or cavity, is a well-known packaging methodology to provide for the easy packaging of meats, medical devices, drugs, and other materials. For instance, the creation of a cavity, or well, can be accomplished through a combined heat and reduced pressure process that molds the web to cavity, whereby the cavity is designed to provide the overall volume needed for packaging the targeted commodity. See, for example, U.S. Pat. No. 3,496,143, which is incorporated herein by reference.

Heating of a cavity mold can be performed by thermal, induction, or radiant sources. Thermal heating, however, is the most preferred methodology due to simplicity and cost considerations. Furthermore, the creation of the cavity from a thermoforming web-stock can be assisted with vacuum application. The negative pressure on the bottom side of a flat web over a mold orifice provides a driving force to distort the web stock into the final desired shape. Creation of the cavity based on size and shape is performed more readily with vacuum thermoforming.

Other common methods of cavity formation include the use of a pressure piston to form the desired shape. Flat web-stock may be inserted into the mold press and under pressure such that a permanent well is formed in flexible films and laminates. Indeed, such cold forming of aluminum foil containing laminates is a common methodology for the production of blister materials in the pharmaceutical markets. For instance, U.S. Pat. No. 4,537,312, which describes the construction of foil blister packaging that is particularly suited for tamper evident pharmaceutical packaging.

Within the blister packaging technical area, high barrier is often necessary and aluminum foils are not susceptible to thermoforming. Thus, the use of cold forming techniques is prevalent. These methods are typically referred to as cold formed foils or CFF. A particularly important forming structure in this area consists of nylon films laminated to aluminum foils and then again to polyvinylchloride films (PVC). Such structures, when formed into blisters, have advantageous product protection, product integrity, and compliance attributes as described in Pharmaceutical Technology, November 2000, pages 66-77, which is also incorporated herein by reference.

Commonly, within the flexible packaging technical field, nylon films have been used in combination with aluminum foil to create many cavity structures. In this regard, it is appreciated that nylon films are known to have high elongation properties and are thus well suited for thermoforming and cold forming processes. Within the molding process itself, it is often necessary for the flat web materials to be able to stretch and distort uniformly under heat and pressure to the desired mold volume. Rheological properties of the material dictate the amount of deformation under an applied stress, strain recovery after elimination of the applied load, and permanence of the strain. For many materials including PET, copolyesters, and blends of PET and miscible components, tan delta values from torsional stress/strain experiments are typically higher at low temperatures and are maximized at the glass transition temperatures of the materials. The importance of these principles to thermoforming can be found, for example, in "Importance of elongational properties of polymer melts for film blowing and thermoforming"; Polymer Engineering & Science Volume 46, Issue 9, pages 1190-1195, September 2006, which is further incorporated herein by reference.

A typically desired input web may be any combination of printed material, barrier webs, adhesives, sealable materials, and the like. In this regard, it is sometimes considered important that all components of the flexible web have the capability to distort uniformly into the mold structure, as differences in moldability between the discontinuous web-stocks of the flexible web can cause molding issues like splitting, uneven distortion, crystallization, or other defects capable of diminishing the suitability of the molded web for the end-use application.

Within the flexible film and flexible packaging technology areas, the use of thermoplastic materials like polyethylene, polypropylene, nylon, polystyrene, polyethylene terephthalate (PET), polylactic acid, and other thermoplastic commodities to produce films is appreciated. Each base polymer, or resin, has intrinsic technical attributes like barrier properties, optical clarity, hardness, surface energy, softness, etc. that makes their selection for the end-use need appropriate. Extruding these thermoplastic polymers into web structures and orienting them into thin films is an important industrial process to induce further enhanced properties into polymeric materials. Stretching and orientation are appreciated in the art to improve tensile and elongation properties, tear properties, scuff resistance, etc. Therefore, it is also appreciated in the art to select a base resin and filming process capable of creating a suitable film substrate for the technical needs in a flexible packaging web.

Among films currently available, PET is a material with excellent barrier, clarity, printability, and hardness properties. Film forming and orientation of that material can be used to create thin profile webs with excellent properties for use in flexible packaging. Typically, such PET films have high thermal stability and low subsequent moldability properties. In fact, although traditional biaxially-oriented PET films can be produced with subsequent down-stream moldability, the moldability is generally not high. Alternatively, however, high thermoforming with PET films can be achieved if the films are not oriented, or are monoaxially oriented as described, for example, in U.S. Pat. No. 4,073, 857, which is also incorporated herein by reference.

Despite the advantageous properties of PET films, when thermoforming oriented PET web material under heat and pressure, current PET film structures and converted webs will often split or break easily. Due to the limitations of current PET films, the utility of these materials for the production of thermoformed trays, wells or cavities has thus been limited. Converters, therefore, often need to select other film materials when the packaging structure involves a thermoformable structure.

To resolve such low formability issues of current PET film materials, there has been research into blends of PET with other materials to improve the molding process. Such techniques, however, although improving the thermo-molding properties, have only created other issues such as increased cost, regulatory clearance issues, optical clarity problems, and recycling issues. Accordingly, there remains a need in the art for PET film structures capable of easy forming and use in a range of end-use packaging requirements, including thermo-formed and cold-formed wells, trays, or cavities, and for a range of applications, including foodstuffs, medical products, and industrial goods.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature (s) mentioned; likewise, those features can be applied to other embodiments of the presently-disclosed subject matter, whether listed in this summary or not. To avoid excessive repetition, this summary does not list or suggest all possible combinations of such features.

The presently-disclosed subject matter includes formable films, laminate structures including the formable films, and processes for producing and using the formable films and laminate structures. In particular, the presently-disclosed subject matter includes biaxially-oriented polyethylene terephthalate (PET) films that are capable of thermoforming or cold forming, laminate structures including such PET films, and methods of making and using the formable PET films and laminate structures.

In some embodiments, a formable film is provided that comprises one or more biaxially-oriented polyethylene terephthalate layers. In some embodiments, such a formable film includes a metaphase with a metaphase transition of about 180° C. to 200° C. as measured by differential scanning calorimetry (DSC) upon a first heating. In some embodiments, the formable film has a molded volume of greater than about 200%. In some embodiments, the formable film has a machine direction total elongation percentage of about 180% to about 300%. In some embodiments, the formable film has a transverse direction total elongation percentage of about 100% to about 300%.

In some embodiments of the presently-described formable films, a formable PET film can be made in a range of thicknesses and/or with various coatings. In some embodiments, the thickness of an exemplary film of the presently-disclosed subject matter is between about 9 µm and about 50 µm. In some embodiments, an exemplary film has a thickness of about 9 µm, about 12 µm, about 15 µm, about 23 µm, about 36 µm or about 50 µm. In some embodiments, the coatings that can be applied to the films are selected from an acrylic coating, a polyurethane coating, a polysulphonester coated, or a quaternary ammonium-based coating.

Regardless of the particular thickness and/or coatings applied to a film, in the formable films described herein, the metaphase of each of the biaxially-oriented polyethylene terephthalate layers is generally configured to increase one or more properties of the film relative to a conventional biaxially-oriented polyethylene terephthalate film. For example, in some embodiments of the formable films described herein, the increased property of the formable film is selected from tensile strength, drawability, formability, or a combination of those properties. For instance, in some embodiments, the biaxially-oriented polyethylene terephthalate formable films have a machine direction tensile strength of greater than about 2000 kgf/cm at 25° C.; a transverse direction tensile strength of greater than about 2500 kgf/cm at 25° C.; a machine direction total elongation percentage measured at 25° C. of greater than 200%; and/or a ratio of transverse direction:machine direction tensile strength of greater than 1.25.

With respect to the one or more biaxially-oriented polyethylene terephthalate layers included in the formable films of the presently-disclosed subject matter, in some embodiments, at least one of the polyethylene terephthalate layers is comprised of a polyethylene terephthalate homopolymer or is comprised of polyethylene terephthalate copolyester. In some embodiments, at least one of the polyethylene terephthalate layers includes silica. Furthermore, in some embodiments of the formable films, the one or more polyethylene terephthalate layers are comprised of at least two, at least three, at least four, or more biaxially-oriented polyethylene terephthalate layers. For example, in some embodiments, a formable film is provided having three biaxially-oriented polyethylene terephthalate layers, and in certain embodiments, one of those three layers includes silica. As another example, in some embodiments of the biaxially-oriented polyethylene terephthalate formable films, the formable film includes an A/B/A structure comprising a first polyethylene terephthalate layer, a silica-containing polyethylene terephthalate layer, and a second polyethylene terephthalate layer.

Also provided herein are processes for producing a formable film. In some embodiments, a process for producing a formable film is provided that includes an initial step of producing one or more biaxially-oriented polyethylene terephthalate layers. In some embodiments, the process then includes: a step of stretching the one or more biaxially-oriented polyethylene terephthalate layers in a machine direction at a temperature of about 75° C. to about 90° C., at a draw percentage of about 200% to about 250%, or a combination thereof; and a step of stretching the one or more biaxially-oriented polyethylene terephthalate layers in a transverse direction at a temperature of about 95° C. to about 105° C., at a draw percentage of about 300% to about 400%, or a combination thereof. In some embodiments, subsequent to the stretching steps, the process includes crystallizing the one or more layers at a temperature of about 150° C. to about 200° C.

With respect to the stretching step, in some embodiments of the process, the one or more biaxially-oriented polyethylene terephthalate layers are stretched in the machine direction at a temperature of about 79° C. In some embodiments, the one or more biaxially-oriented polyethylene terephthalate layers are stretched in the machine direction at a draw percentage of about 228%. In some embodiments, the one or more layers are stretched in the transverse direction at a temperature of about 102° C. to about 106° C. In some other embodiments, the stretching step includes stretching the one or more layers in the transverse direction at a draw percentage of about 300% to about 400%, such as, in some embodiments, a draw percentage of about 390%.

Turning now to the crystallization step, in some embodiments, the crystallizing step is performed at a temperature of about 150° C. to about 200° C. In some embodiments, the temperature is varied according to the number of layers, coatings, and thickness of the film. In some embodiments of the process, the step of crystallizing the film is performed at a temperature of about 180° C.

In some embodiments of the processes for producing a formable film described herein, a process for producing a formable film includes a further step of allowing the film to relax to further induce a metaphase in the film. In some embodiments, the formable film is allowed to relax at a temperature of about 50° C. to about 60° C. In some embodiments, the formable film is allowed to relax at a temperature of about 59° C. The relaxation percentage at which the formable film is allowed to relax can be varied according to final desired properties of the formable film. In some embodiments, the formable film is allowed to relax to a relaxation percentage greater than about 5%. In some embodiments, the relaxation percentage is about 6%.

In some embodiments of the presently-disclosed formable films, a formable film is provided that includes one or more biaxially-oriented polyethylene terephthalate layers, and that includes a metastable phase in which the metastable phase has a phase transition temperature of about 50° C. less than the crystalline melting point of the film as measured by differential scanning calorimetry. In some embodiments, the formable film is capable of forming a cavity with little spring-back force.

In yet other embodiments of the presently-disclosed subject matter, the formable films described herein can also be included as part of a laminate structure. In some embodiments, a laminate structure is provided that includes a formable film including one or more biaxially-oriented polyethylene terephthalate films with the formable film having a metaphase as described herein above and also having a molded volume of greater than about 200% when compared to traditional biaxially-oriented PET films. In some embodiments, one or more additional layers are laminated to the one or more biaxially-oriented polyethylene terephthalate layers to thereby produce the laminate structure. In some embodiments, the one or more additional layers of the laminate structure are selected from an aluminum foil layer and a polyvinyl chloride layer. In some embodiments, the one or more additional layers are laminated to the one or more biaxially-oriented polyethylene terephthalate layers with an adhesive.

In some embodiments of the presently-disclosed laminate structures, a laminate structure is provided that includes a single biaxially-oriented polyethylene terephthalate layer, an aluminum foil layer laminated to the single biaxially-oriented polyethylene terephthalate layer, and a polyvinyl chloride layer laminated to the aluminum foil layer. In other embodiments, an exemplary laminate structure includes a first biaxially-oriented polyethylene terephthalate layer and a second biaxially-oriented polyethylene terephthalate layer, and an aluminum foil layer interposed between the first biaxially-oriented polyethylene terephthalate layer and the second biaxially-oriented polyethylene terephthalate layer. In other embodiments, the first biaxially-oriented polyethylene terephthalate layer includes a isophthalate copolyester skin layer.

In further embodiments, the laminate structures can also include properties suited for a particular end use. For instance, in some embodiments, the laminate structure has a puncture strength greater than about 9.00 $N/mm^2$ and/or a dart impact strength greater than about 650 $g/cm^2$.

Further provided herein are processes for producing a packaging (e.g., a blister packaging) using the laminate structures of the presently-disclosed subject matter. In some embodiments, the process comprises providing a laminate structure including: a formable film having one or more biaxially-oriented polyethylene terephthalate layers, and having a metaphase configured to increase a property of the formable film; and one or more additional layers laminated to the one or more biaxially-oriented polyethylene terephthalate layers. In some embodiments, subsequent to providing the laminate structure, the laminate structure then undergoes cold forming into a desired shape. In some embodiments, the biaxially-oriented polyethylene terephthalate layers used to produce the laminate structures include a metaphase configured to increase a property of the film selected from the group consisting of tensile strength, drawability, thermoformability, and combinations of these properties.

In some embodiments of the process for producing a packaging, the laminate structure includes a single biaxially-oriented polyethylene terephthalate layer, with an aluminum foil layer laminated to the single biaxially-oriented polyethylene terephthalate layer and a polyvinyl chloride layer laminated to the aluminum foil layer. In other embodiments of the process, the laminate structure includes a first biaxially-oriented polyethylene terephthalate layer and a second biaxially-oriented polyethylene terephthalate layer, with an aluminum foil layer interposed between the first biaxially-oriented polyethylene terephthalate layer and the second biaxially-oriented polyethylene terephthalate layer. In some embodiments, the process for producing a packaging additionally includes the step of sealing the laminate structure to a lid subsequent to cold forming the laminate structure. In some embodiments, the lid is comprised of an aluminum foil.

Further features and advantages of the presently-disclosed subject matter will become evident to those of ordinary skill in the art after a study of the description, figures, and non-limiting examples in this document.

DESCRIPTION OF EXEMPLARY EMBODIMENTS

Figure 1:
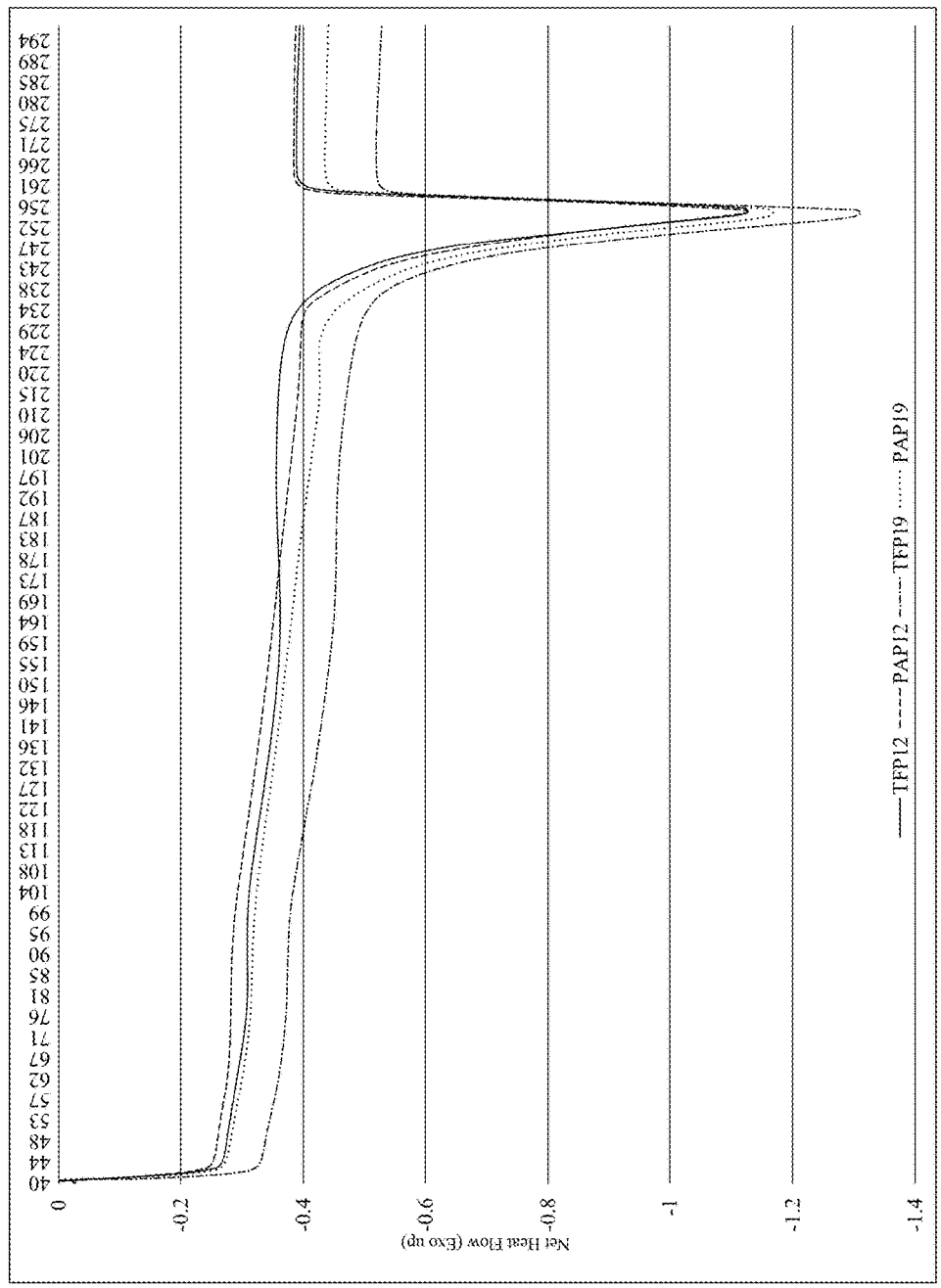
FIG. 1 is a graph showing the glass behavior of formable PET films of the presently-disclosed subject matter (TFP) as compared to conventionally-produced control PET films (PAP), where the samples tested had thickness of 19 μm and 12 μm.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as is commonly understood by one of skill in the art to which the invention(s) belong. All patents, patent applications, published applications and publications, databases, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims. Thus, for example, reference to "a layer" includes a plurality of such layers, and so forth, unless indicated otherwise.

Also unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter includes formable films, laminate structures including the formable films, and processes for producing and using the formable films and laminate structures. In particular, the presently-disclosed subject matter includes biaxially-oriented polyethylene terephthalate (PET) films that are capable of thermoforming or cold forming, laminate structures including such PET films, and methods of making and using the formable PET films and laminate structures.

In some embodiments of the presently-disclosed subject matter, a formable film is provided that is comprised of biaxially-oriented polyethylene terephthalate (PET) films or layers that are capable of thermoforming or cold-forming without the use of copolymers or blends of PET resins. In some embodiments, a formable film capable of easy thermoforming or cold-forming is provided that comprises one or more biaxially-oriented PET layers, and that includes a metaphase that is induced during the manufacturing process and is configured to increase a property of the film selected from the group consisting of tensile strength, drawability, thermoformability, and combinations thereof. In some embodiments, such a formable film: includes a metaphase with a metaphase transition of about 180° C. to 200° C. as measured by differential scanning calorimetry (DSC) upon a first heating; has a molded volume of greater than about 200%; has a machine direction total elongation percentage of about 180% to about 300%; and/or has a transverse direction total elongation percentage of about 100% to about 300%. In some embodiments, through the induction of such a metaphase, a formable film made in accordance with the present invention includes a machine direction tensile strength of greater than about 2000 kgf/cm at 25° C.; a transverse direction tensile strength of greater than about 2500 kgf/cm at 25° C.; a machine direction total elongation percentage measured at 25° C. of greater than 200%; and/or a ratio of transverse direction:machine direction tensile strength of greater than 1.25.

The phrase "total elongation percentage" and grammatical variations thereof is used herein to refer to the amount of increase in the length of a particular film that occurs before the breakage of the film and that occurs as a result of a force applied to the film. Such a total elongation percentage can be measured, for instance, in a typical universal testing machine whereby 1 inch strips of film are cut and the total travel of the cross-head in the universal testing machine is measured at the point of film breakage and the total elongation percentage is calculated based on that measurement. For example, in such an evaluation, if a 1 inch length of film is elongated by 2.5 inches before breakage, the total elongation percentage of that film would be calculated as 150%. In some embodiments, such testing is based on ASTM D822.

Similarly, the phrase "molded volume" and grammatical variations thereof is used to refer to the amount of increase in the volume exhibited by a particular film before breakage of the film occurs. In this regard, molded volume is typically measured by making use of heat and reduced pressure experiments by which thin film materials are placed over a cavity mold and, under heat and reduced pressure, molded into a half-moon shape. Generally, such experimental procedures are optimized to produce the maximum molded volume before breakage of the web occurs. The relative volume measured before breakage occurs is then normalized to a traditionally manufactured biaxially-oriented PET film that would give 100% normalized volume under optimal conditions.

Turning now to the metaphase included in the films of the presently-disclosed subject matter, as used herein, the term "metaphase" is used to refer to a unique amorphous phase in the film that gives the film excellent formability (e.g., thermoformability) and elongation, and which is not found in standard biaxially-oriented PET films. Such a metaphase is readily observed in the differential scanning calorimetry (DSC) profile of the presently-described films as a deflection point in the heat-flow curves at approximately 180° C. to about 200° C. (e.g., 190° C.) upon first heating experiments. Being a metastable phase, second heating or annealing experiments then will not reveal this phase as the metaphase will be squelched. In this regard, and while not wishing to be bound by any particular theory, it is believed that the metaphase is a quasi-stable phase intermediate in composition between that of the crystalline and amorphous materials typical of a semicrystalline thermoplastic material. In particular, it is believed that the metaphase is a tied amorphous material associated with the crystalline structure and having additional latent elongation properties that allow for significantly higher formability within the films of the presently-disclosed subject matter.

In some embodiments, the easily formable films described herein can be described as having a metastable phase having a phase transition temperature less than the crystalline melting point of the film as measured by DSC. In some embodiments, the phase transition temperature is about 40° C. less, about 45° C. less, about 50° C. less, about 55° C. less, about 60° C., or about 65° C. less than the crystalline melting point of the film as measured by DSC.

As noted, in some embodiments, the thermoplastic films of the presently disclosed subject matter include one or more biaxially-oriented PET layers that of capable of cold forming and of thermoforming, and thus, in some embodiments, the formable films described herein can also be referred to as "thermoplastic" films that are generally capable of being repeatedly hardened when cooled and softened when heated. In some embodiments, the polyethylene terephthalate layer or layers included in the thermoplastic films comprises polyethylene terephthalate homopolymers, where the polyethylene terephthalate layer consists of only polyethylene terephthalate or is comprised of polyethylene terephthalate copolyester, where the polyethylene terephthalate layer includes one or more diacids, diols, or combinations thereof. For instance in some embodiments, a polyethylene terephthalate copolyester obtained from recycled content bottle resin (i.e., PET resin with about 2% isophthalic acid) can be utilized to enhance the draw properties of an exemplary film. Additionally or alternatively, other embodiments of the presently-described thermoformable films include a polyethylene terephthalate layer that comprises one or more additives, such as silica.

Regardless of whether the PET layer includes PET homopolymers or PET polymers with additives such as silica, each PET layer included in a formable film of the presently-disclosed subject matter is generally prepared by processes known to those of ordinary skill in the art including the use of conventional sequential biaxial orientation machines having a single screw mainline extrusion train and a twin screw sub-extrusion process. In this regard, in some embodiments, standard PET pellets having a desired intrinsic viscosity can be fed into the main extrusion line, while pellets of another composition can be fed into a sub-extrusion process. For instance, a blend of standard polyethylene terephthalate pellets and silica-filled polyethylene terephthalate pellets can be fed in to the sub-extrusion process. The materials can then be melted separately and laminated together in a feed-block to produce a desired multilayer molten structure (e.g., an A/B/A molten structure) in an extrusion die.

Through laminating the various layers of materials together, in some embodiments, the films described herein can thus be comprised of a plurality of layers or in other words can comprise a "multilayer film" having two or more layers that can differ in composition and/or physical properties. In certain embodiments, the films comprise three layers (e.g., an A/B/A configuration). Additionally, in some embodiments, at least one of the layers in an exemplary multilayer film includes silica. In some embodiments, exemplary multilayer films comprise a layer that includes silica interposed between layers that do not include silica. In some embodiments, the multilayer film comprises, from top to bottom, a first polyethylene terephthalate layer, a polyethylene terephthalate-silica layer, and a second polyethylene terephthalate layer.

Regardless of the particular multi-layer structure included in a formable film or layer of the present invention, once the materials and/or various layers are melted and laminated together, the PET material or layer emerging from the extrusion die is generally subsequently quenched on a chilled casting drum to produce a thick, amorphous film structure. The polyester film or layer is then stretched about 2 to about 5 times in the machine or longitudinal direction. In some embodiments, the step of stretching the multilayer film in the longitudinal direction includes stretching the multilayer film by a factor of about 2 to about 4. After stretching in the longitudinal direction, the film is then stretched about 2 to about 5 times in the transverse direction. In some embodiments, the step of stretching the multilayer film in the transverse direction includes stretching the multilayer film by a factor of about 3 to about 4.5. In some embodiments, the resulting PET layer has a total thickness of about 12 μm to about 50 μm. In some embodiments, an exemplary film has a thickness of about 9 μm, about 12 μm, about 15 μm, about 20 μm, about 23 μm, about 25 μm, about 30 μm, about 35 μm, about 36 μm, about 40 μm, about 45 μm, or about 50 μm.

As described above, by inducing a metaphase in the formable films of the presently-disclosed subject matter, it has been surprisingly found that a biaxially-oriented PET film or layer can be produced that displays increased tensile strength, as well as increased drawability and/or thermoformability. In particular, it has been surprisingly determined that such a metaphase can be induced, and the resulting properties obtained, through the orienting of the film at reduced temperatures and draw ratios, and by allowing the biaxially-orienting PET film or layer to relax to a greater extent than is done in the production of other thermoformable films.

In this regard, in some embodiments and to produce a PET film or layer having enhanced tensile strength, drawability, and/or thermoformability relative to other films, stretching in the machine direction is performed at a temperature of about 75° C., about 80° C., about 85° C., or about 90° C. and/or at a draw percentage of about 200%, about 210%, about 220%, about 230%, about 240%, or about 250%. In some embodiments, stretching in the machine direction is performed at a temperature of about 75° C. to about 90° C., such as, in some embodiments, about 79° C. In some embodiments, stretching in the machine direction is performed at a draw percentage of about 200% to about 250%, such as, in some embodiments, about 228%. As used herein, draw percentage of a film refers to a measurement of the difference in length at start versus its finished length. For example, a 1"×1" sample stretched to a 3"×3" square has a draw percentage of 300% in both dimensions.

Upon stretching the film in the machine direction, the film is subsequently stretched in the transverse direction. In some embodiments, and again to produce a film having enhanced tensile strength, drawability, and thermoformability relative to other thermoforming films, the one or more layers of PET film are stretched in a transverse direction at a temperature of about 95° C., about 100° C., about 105° C., to about 110° C. and/or at a draw percentage of about 300%, about 310%, about 320%, about 330%, about 340%, about 350%, about 360%, about 370%, about 380%, about 390%, to about 400%. In some embodiments, stretching in the machine direction is performed at a temperature of about 95° C. to about 110° C., such as, in some embodiments, about 102° C. to about 106° C. In some embodiments, stretching in the machine direction is performed at a draw percentage of about 300% to about 400%, such as, in some embodiments, about 390%.

Subsequent to stretching the film in the transverse direction, the film is then typically heated to crystallize or further set the crystalline structure of the film. Such a crystallization during or subsequent to the transverse direction orientation is generally performed at substantially lower temperatures than used in producing standard thermoformable films. For example, in some embodiments of the presently-disclosed subject matter, the crystallization temperatures of the one or more biaxially-oriented PET layers is performed at a temperature of about 150° C., about 160° C., about 170° C., about 180° C., about 190° C., or about 200° C. In some embodiments, the crystallization temperature is about 150° C. to about 200° C., such as, in some embodiments, about 180° C.

After crystallizing the film, and as described above, the PET film is then allowed to relax to further induce a metaphase within the film. In some embodiments, relaxing a film in accordance with the presently-disclosed subject matter is performed at higher relaxation percentages than what is generally observed and utilized for the production of films. Relaxation percentage is the amount the material is allowed to shrink under tension. For example, a material 300" wide that is allowed to shrink to 297" under tension has a relaxation percentage of 1%. In this regard, in some embodiments, the formable films described herein are allowed to relax at a relaxation percentage of greater than about 5%, such as, in some embodiments, about 5.9% or 6%. In some embodiments, the film is allowed to relax at the foregoing percentage and at a temperature of about 50° C. to about 60° C., such as, in some embodiments, about 59° C. to induce a metaphase in the PET film or layer and thereby improve the tensile strength, drawability, thermoformability of the PET film or layer relative to other formable films. In some embodiments, and without wishing to be bound by any theory, the process parameters, draw ratios, temperatures and relaxation percentages are thought to interact to develop the metaphase that, in turn, allows high elongation, thermoforming and good shrinkage and tensile properties.

A formable PET film made in accordance with the presently-disclosed subject matter can also be made with various coatings. In some embodiments, a coating can be applied to the film after the step of stretching the multilayer film in a longitudinal direction, but prior to the step of stretching the multilayer film in the transverse direction as described above. In some embodiments, the step of coating the film comprises coating at least one side of the film with a coating selected from the group consisting of an acrylic coating, a polyurethane coating, a polysulphonester coating, and a quaternary ammonium-based coating. Such coatings can be applied to a formable film described herein by a number of methods, including application of the coating material in a dispersion or solution of water, and by an application method such as gravure coating, meyer rod coating, slot die, knife over roll, or any variation of roll coating. In some embodiments, the coating material is applied by inline coating, whereby the coating material is applied to the film as it is being produced.

In some embodiments, the polyurethane coatings utilized in a film of the presently-disclosed subject matter can be comprised of any particular high molecular weight components well known in the art, including, in certain embodiments, aliphatic polyurethane coatings with a Tg greater than 50° C. Exemplary polysulphonester coatings that are utilized are typically of a higher molecular weight to avoid blocking after coating and drying within process. Such polysulphonester coatings include, in certain embodiments, those with a compositional Tg greater than 35° C. In some embodiments that make use of quaternary ammonium based coatings, the quaternary ammonium based coating can be of any class of high molecular weight quaternary ammonium coatings sufficient to prevent transfer within the film making process.

In some embodiments, the coating applied to the formable film is in form of an acrylic primer, which, in certain embodiments, can then form a cross-linked acrylic primer layer on the film. In some embodiments, to produce an acrylic primer layer having such properties, the acrylic primer layer can be comprised of an acrylic resin that adheres well to a polyethylene terephthalate layer. Such acrylic resins can be selected from resins having a monomer component such as, for example, an alkyl acrylate, an alkyl methacrylate, (examples of such alkyl groups include a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group and the like), a monomer having a hydroxyl group such as 2-hydroxyethyl acrylate, 2-hydroxyethyl methacrylate, 2-hydroxypropyl acrylate, 2-hydroxypropyl methacrylate or the like, a monomer having an amide group such as acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide or the like, a monomer having an amino group such as N,N-diethylamino ethyl acrylate, N,N-diethylamino ethyl methacrylate or the like, a monomer having an epoxy group such as glycidyl acrylate, glycidyl methacrylate or the like, a monomer having a carboxylic acid or a salt thereof such as acrylic acid, methacrylic acid or a salt thereof (an alkali metal salt, an alkali earth metal salt, an ammonium salt or the like) and the like whereupon one or more types of such monomer components are copolymerized. In some embodiments, the acrylic primer is comprised of a copolymer of methyl methacrylate that further includes methacrylic acid and methacrylonitrile. In some embodiments, the acrylic primer is comprised of a co-polymer of methylmethacrylate, butylacrylate, methacrylic acid, methyl acrylate, acrylic acid, and hydroxyethylmethacrylate, alone or in combination with other monomers, as such a combination of monomers has been observed to produce an acrylic primer layer having sufficient hardness and COF values as well as a sufficient ability to adhere to down-stream sealants including, but not limited to, polyethylene, ethylene vinyl acetate, ethylene methyl acrylate, and copolymers and terpolymers thereof.

In addition to the acrylic components of the acrylic primer layer, one or more cross-linking agents can also be included in the acrylic primer layer to harden the acrylic primer layer, to reinforce the bonding between the various layers of the thermoplastic film, and to also provide a highly cross-linked layer. Exemplary cross-linking agents that can be used with the acrylic components include, but are not limited to, melamine-based cross-linkers, epoxy-based cross-linkers, aziridine-based cross-linkers, epoxyamide compounds, titanate-based coupling agents (e.g., titanium chelate), oxazoline-based cross-linkers, isocyanate-based cross-linkers, methylolurea or alkylolurea-based cross-linkers, aldehyde-based cross-linkers, and acrylamide-based cross-linkers. In some embodiments, the cross-linking agent is selected from melamine, epoxy-based cross-linkers, and aldehyde-based cross-linkers.

In yet further embodiments of the presently-disclosed subject matter, and as a result of the improved properties exhibited by the metaphasic biaxially-oriented PET film or layers, and as described above, it has been determined that the metaphasic biaxially-oriented PET films or layers are also particularly suited for use with cold forming methodologies and in the production of blister packaging or other packaging that requires the formation of wells, cavities, or trays useful in the packaging of foodstuffs, medicinal products, and industrial goods. In this regard, and as also described above, in some embodiments, laminate structures are provided that include one or more additional layers laminated to the one or more metaphasic biaxially-oriented PET layers of the presently-disclosed subject matter. In some embodiments, such additional layers include, but are not limited to, an aluminum foil layer, a polyvinyl chloride (PVC) layer, or an isophthalate copolyester skin layer that can be co-extruded with the PET layer to produce a single film component. In some embodiments, the additional layers can be comprised of any easily formable material having sufficient elongation properties, such as polyethylene films, polypropylene films, polystyrene films, amorphous PET films, cyclic olefin copolymer films (COC), polymethylpentane (PMP) films, and the like.

Figure 3:
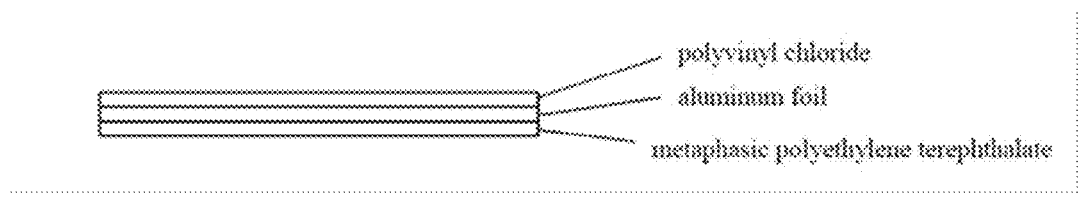
FIG. 3 is a schematic diagram of an exemplary laminate structure made in accordance with the presently-disclosed subject matter and having an aluminum foil layer laminated atop a single biaxially-oriented PET layer having a metaphase, and a polyvinyl chloride layer laminated atop the aluminum foil layer.

As one example of a laminate structure made in accordance with the present invention and including one or more metaphasic biaxially-oriented PET layers and one or more additional layers laminated to the PET layer or layers, in some embodiments, the laminate structure includes a single metaphasic biaxially-oriented PET layer. An aluminum foil layer is then laminated atop the single biaxially-oriented PET layer, and a polyvinyl chloride layer is subsequently laminated atop the aluminum foil layer to produce a laminate structure of the presently-disclosed subject matter. A schematic diagram showing such a laminate structure is provided in FIG. 3.

Figure 4:
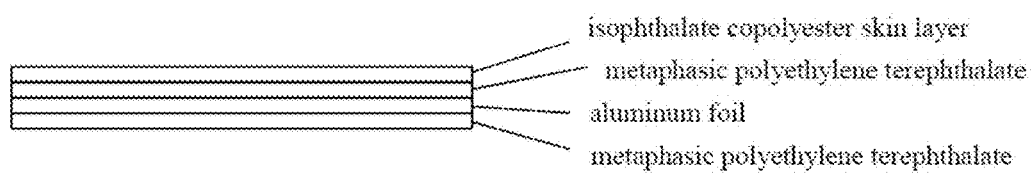
FIG. 4 is a schematic diagram of an exemplary laminate structure of the presently-disclosed subject matter and having an isophthalate copolyester skin layer, a metaphasic polyethylene terephthalate layer, an aluminum foil layer, and another metaphasic polyethylene terephthalate layer.
Figure 5:
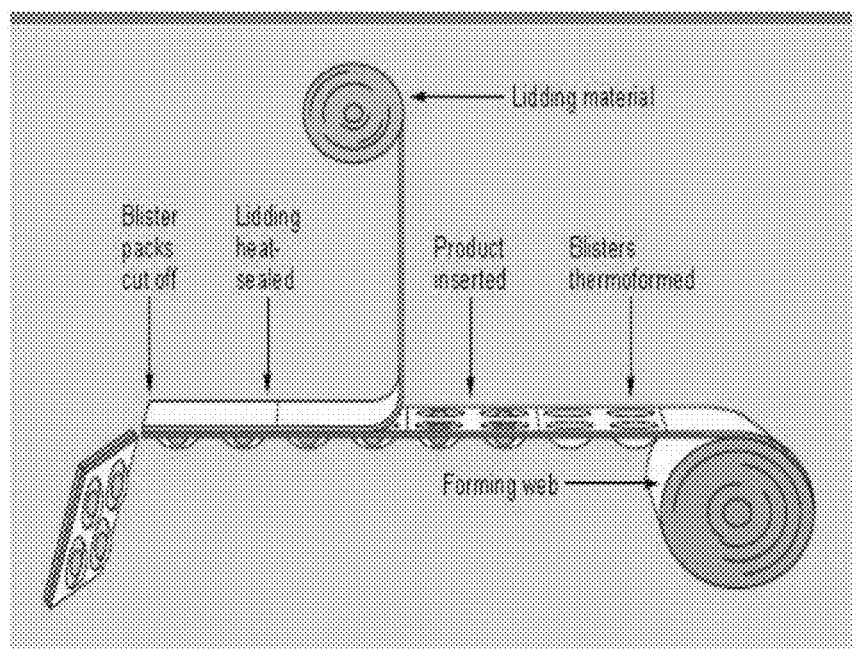
FIG. 5 is a schematic diagram showing a laminate structure and a lidding foil utilized in a production process in accordance with the presently-disclosed subject matter.

As another example of a laminate structure of the presently-disclosed subject matter, in another embodiment, a laminate structure is provided that comprises a first metaphasic biaxially-oriented PET layer and a second metaphasic biaxially-oriented PET layer, with an aluminum foil layer interposed between the first metaphasic biaxially-oriented PET layer and the second biaxially-oriented PET layer. In some embodiments, the first metaphasic biaxially-oriented PET layer is co-extruded during production along with isophthalate copolymer to produce a single PET film component at the top of the laminate structure or, in other words, a first metaphasic PET film layer that includes a isophthalate copolyester skin layer, as shown, for example, in FIG. 4.

With respect to laminating the various layers together, various methods known to those skilled in the art can be used to laminate the metaphasic biaxially-oriented PET layers to one or more additional layers and form a laminate structure as described herein. Such lamination methods include roll, gravure, or slot dye methods. In this regard, in some embodiments, the various layers are laminated together using an adhesive, such as, in some embodiments, ADCOTE® 811A+COREACTANT F, produced by Rohm and Haas Chemicals LLC, Philadelphia, Pa. Of course, other adhesives can also be used in accordance with the presently-disclosed subject matter including adhesives based on reactions of polyols and urethane prepolymers.

Regardless of the particular means or adhesives used to laminate the various layers together, by making use of one or more metaphasic biaxially-oriented PET layers, it has been observed that the laminate structures made in accordance with the presently-disclosed subject matter surprisingly exhibit strength characteristics and properties similar to nylon film-based packaging. For instance, in some embodiments, the laminate structure has a puncture strength greater than about 9.00 N/mm$^2$. In some embodiments, the laminate structure has a dart impact strength greater than about 650 g/cm$^2$.

Further provided, in some embodiments of the presently-disclosed subject matter are methods for producing a packaging such as a blister packaging. In some embodiments, a method for producing a packaging comprises the steps of providing a laminate structure of the presently-disclosed subject matter, and cold forming the laminate structure. In some embodiments, a method of producing a blister packaging further comprises the step of sealing the laminate structure to a lid subsequent to cold forming the laminate structure. In some embodiments, the lid is comprised of an aluminum foil.

The presently-disclosed subject matter is further illustrated by the following specific but non-limiting examples.

EXAMPLES

Example 1—Preparation of Formable PET Film

Polyethylene terephthalate (PET) film was prepared via a conventional sequential biaxial orientation machine having a single screw mainline extrusion train and a twin screw sub-extrusion process. PET pellets having a desired intrinsic viscosity were fed into the main extrusion line, while a blend of standard PET pellets and silica-filled PET pellets were fed into the sub-extrusion process, such that the materials could be melted separately and then laminated together in a feed-block to produce a desired molten structure (e.g., an A/B/A molten structure) in an extrusion die. The laminated PET material or layer emerging from the extrusion die was then quenched on a chilled casting drum to produce a thick, amorphous film structure.

That amorphous film was then subsequently stretched in the machine direction (MD), or long direction axis of the film, utilizing a heater roller train. The now MD oriented film was then stretched in the transverse direction (TD) with a chain driven system. Table 1 below provides exemplary processing parameters used to produce the PET film or layer made in accordance with the presently-disclosed subject matter as compared with the processing parameters typically utilized to produce a thermoformable, thin, biaxially-oriented polyester film (F-PAP; Flex Films, Inc.). In short, the two-step process described above induced the biaxial orientation of the PET polymer chains in the easily formable PET film giving tensile strength and other properties.

TABLE 1

Exemplary processing parameters of a PET film made in accordance with the presently-disclosed subject matter as compared to a commercially-available F-PAP film.

| | F-PAP Comparative | Thermo-formable PET Film | F-PAP Comparative | Thermo-formable PET Film |
|---|---|---|---|---|
| Thickness | 23 μm | 23 μm | 12 μm | 12 μm |
| MDO Temperature | 82° C. | 79° C. | 82° C. | 82° C. |
| MDO Temperature | 88° C. | 82° C. | 88° C. | 86° C. |
| MDO Draw % | 330% | 228% | 334% | 260% |
| TDO stretching Temperature | 102° C. | 102° C. | 102° C. | 102° C. |
| TDO stretching Temperature | 108° C. | 106° C. | 108° C. | 106° C. |
| TDO crystallizing Temperature | 225° C. | 180° C. | 225° C. | 180° C. |
| TDO Relax Temperature | 59° C. | 59° C. | 59° C. | 59° C. |
| TDO Draw % | 405% | 391% | 400% | 395% |
| Relaxation % | 2.9% | 5.9% | 2.9% | 5.4% |

Example 2—Measurement of Thermoformability

Following production of the PET films, the thermoformability of the film was subsequently measured and analyzed. Briefly, to measure the thermoformability of the films, an aluminum block was assembled to form a circular mold 4 inches in diameter and 1.25 inch deep (volume≈257 ml) with a vacuum line attached to the base. A 6.5 in square of the film to be tested was placed over the open top of the mold and held in place with a flange to form an airtight seal. The mold was then placed into a preheated forced-air oven at a temperature 20° C. to 40° C. above the target forming temperature. As the film warmed, the surface temperature was monitored by a thermocouple and when the target temperature was reached, a vacuum of 26.5 inHg below ambient was applied for 0.5 seconds (controlled using a PLC). The mold was then immediately removed to avoid shrinkage. To measure the volume, a very light vacuum (approximately 1 inHg) was applied to pull the formed film into shape without further deforming the film, and water from a graduated cylinder was then carefully poured until the surface tension snapped the meniscus to the lower edge of the flange. The remaining volume of the graduated cylinder was then read off and subtracted from the initial to determine the displacement. Relative formability could also be judged by comparing the volumes of plain films, the thermoformable PET film, and co-polyester based films formed under the same conditions.

Upon analysis of the results from the comparison of the thermoformable PET film to the F-PAP film at thicknesses of both 12 μm and 23 μm, it was found that the thermoformable PET film exhibited an increased machine direction elongation percentage, an increased transverse direction elongation percentage, and increased machine direction tensile strength, an increased transverse direction tensile strength, and a higher increase in maximum volume as compared to the F-PAP film and as described in Table 2 below.

TABLE 2

Measured properties of the Inventive samples at two thicknesses, with the comparative examples of F-PAP.

| | MD Elongation % | TD Elongation % | MD Tensile | TD Tensile | MAX Volume |
|---|---|---|---|---|---|
| Inventive Example 23 μm | 260% | 124% | 2140 | 3050 | 220% |
| Inventive Example 12 μm | 210% | 105 | 2200 | 2740 | 240% |
| Comparative Example 23 μm | 115% | 85% | 1900 | 2000 | 140% |
| Comparative Example 12 μm | 105 | 85 | 1900 | 2000 | 120% |

Example 3—Measurement of Tensile Strength as a Function of Temperature

To further examine the properties of the formable PET films made in accordance with the presently-disclosed subject matter, the formable PET film and control film were tested on a Dynamic Mechanical Analysis (DMA) machine at various temperatures and the modulus properties at low stretching was measured. Conditions of testing were as described by ASTM D 882. Table 3 below shows the results of the experiments of tensile strength as a function of temperature:

For this data a Lloyd tensile tester is used to measure tensile properties of test specimen which is about 1" wide. The Lloyd tensile tester has an enclosed chamber, which is temperature controlled, and the test specimen is pulled by placing between set of grips. The tensile strength is reported on HMI at various set temperatures.

TABLE 3

Tensile strength as a function of temperature (tensile strength at yield is provided in PSI).

| | Temperature | | | |
|---|---|---|---|---|
| | 25° C. | 40° C. | 55° C. | 75° C. |
| Comparative 12μ - MD | 14,400 | 13,600 | 14,200 | 11,100 |
| Inventive 12μ - MD | 15,100 | 14,750 | 13,500 | 10,150 |

TABLE 3-continued

Tensile strength as a function of temperature
(tensile strength at yield is provided in PSI).

|  | Temperature | | | |
| --- | --- | --- | --- | --- |
|  | 25° C. | 40° C. | 55° C. | 75° C. |
| Comparative 12μ - TD | 14,000 | 14,100 | 13,900 | 9650 |
| Inventive 12μ - TD | 14,550 | 14,200 | 13,900 | 10,350 |

Table 4 provides comparative measurements of percent elongation as a function of temperature of inventive samples of the presently-disclosed subject matter.

TABLE 4

Percent Elongation as a function of
temperature (% Elongation at break).

|  | Temperature | | | |
| --- | --- | --- | --- | --- |
|  | 25° C. | 40° C. | 55° C. | 75° C. |
| Comparative 12μ - MD | 45 | 62.6 | 43.6 | 76 |
| Inventive 12μ - MD | 34 | 63.5 | 71.2 | 60.0 |
| Comparative 12μ - TD | 64.1 | 49.8 | 68.2 | 87.2 |
| Inventive 12μ - TD | 62.7 | 126.3 | 150.5 | 132.5 |

Example 4—Differential Scanning Calorimetry (DSC) Shows Higher Temperature Glass Transitions in the Inventive Films DSC is an analytical methodology to probe the morphology of many materials and, in the case of polymers and films, DSC is often used to determine the glass transition, crystalline melting phases, crystallization temperatures and other phase transitions as differences in phase transitions between samples of materials is evidence of the morphological differences and can be important in end-use properties. As such, DSC was further used to evaluate the thermoformable PET films of the presently-disclosed subject matter. Differential Scanning calorimetry (DSC) measures specific heat capacity, heat of transition, and the temperature of phase changes. It also measures the rate of heat flow and compares differences between the heat flow rate of the test sample and known reference materials. This difference determines variations in material composition, crystallinity and overall morphology.

In the present case, the samples were analyzed using a TA Q2000 DSC. The samples were brought to equilibrium at 20° C. then heated to 300° C. at 20° C./min, and then held isothermally for 0.1 min. The experiment took place in UHP nitrogen with a flow rate of 50 mL/min. Upon analysis of the results from the DSC experiments, for 19 μm and 12 μm thermoformable PET film examples, the DSC experiments showed differences in the glass behavior of the materials as compared to control samples and as shown in FIG. 1. In particular, the glass transitions between the thermoformable PET samples and the control samples were shifted to higher temperatures in the case of the PET samples. In this regard, and although not wanting to be bound by any particular theory, it was believed that the thermoformable biaxially-oriented PET film samples included an increased amorphous density that, in turn, increased the thermoformability of the inventive materials.

Figure 2:
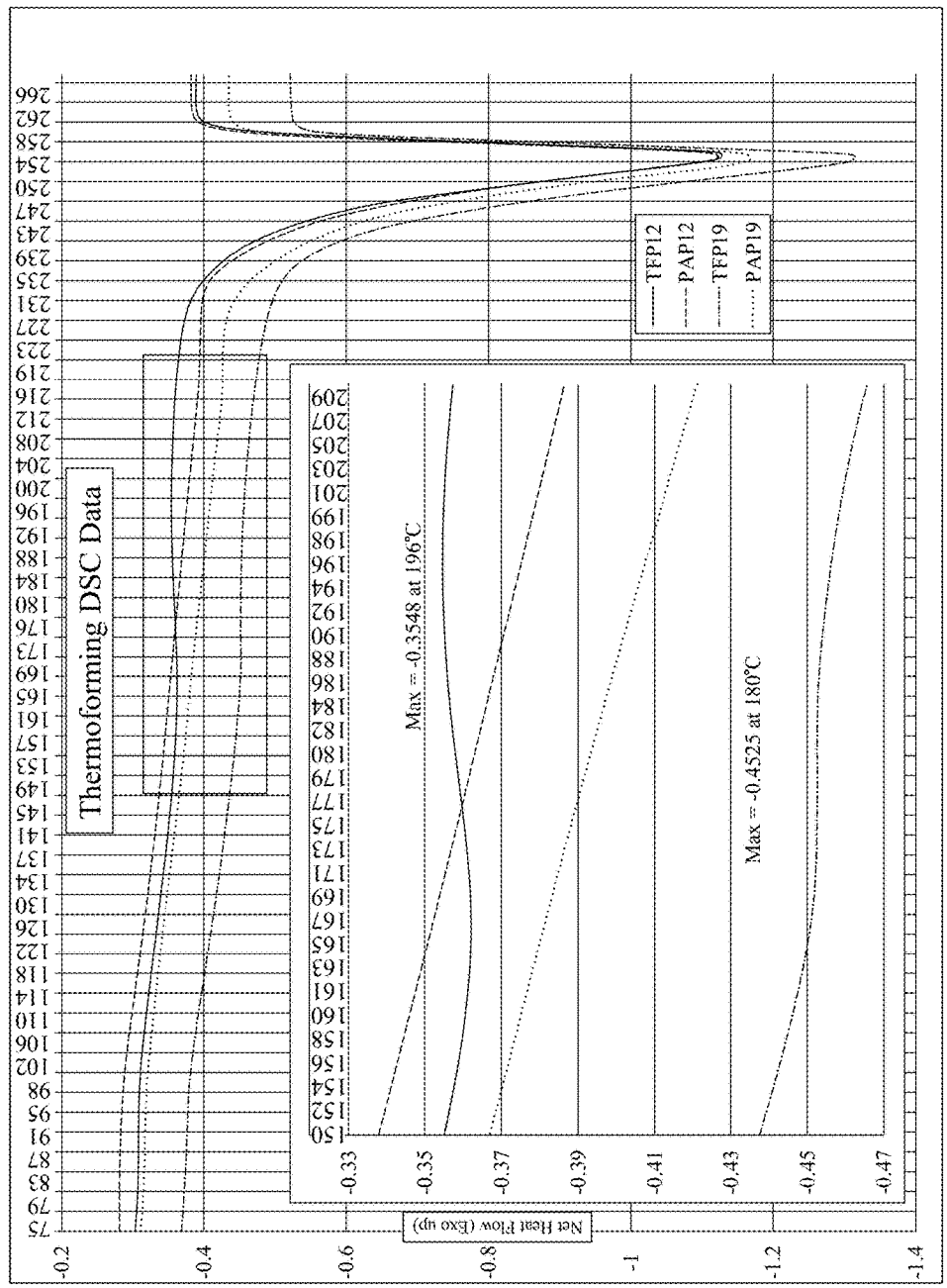
FIG. 2 is a graph showing differential scanning calorimetry (DSC) data and net heat flow data obtained from formable PET films of the presently-disclosed subject matter (TFP) and from conventionally-produced control PET films (PAP), where the samples tested had thickness of 19 μm and 12 μm.

Further evidence of the amorphous density could also be determined through other DSC experiments (see, e.g., FIG. 2). In particular, if the film samples were subjected to a heat/cool/heat cycle, the DSC data for inventive and control samples were virtually identical. The heating and cooling of the samples changed the morphology and homogenized the properties noted. The metaphase is readily apparent in the DSC profile of the inventive films having a deflection point in the heat-flow curves at approximately 190° C. (between about 180° C. and 200° C.) upon first heating experiments. Being a metastable phase, second heating, or annealing experiments, would not reveal this phase as the metaphase was squelched.

Example 5—Preparation of Laminate PET Film

To prepare a laminate polyethylene terephthalate (PET) film or layer in accordance with the presently-disclosed subject matter, a 23 μm metaphasic biaxially oriented PET film was first prepared on a commercially-suitable production line. Briefly, the metaphasic PET film was prepared via a conventional sequential biaxial orientation machine having a single screw mainline extrusion train and a twin screw sub-extrusion process as described above in Example 1. After production, the metaphasic PET film was taken to an off-line coater/laminator and laminated to 45 μm dead-soft aluminum foil using 5 g dry weight of an adhesive. The adhesive used for the lamination was a two part solvent-based adhesive supplied by Rohm and Haas as Adcote 11A+Coreactant F. That lamination was then allowed to cure for 7 days and was subsequently laminated to a 50 μm polyvinyl chloride film. The PVC film was supplied by Hanwha using, again, a solvent based adhesive as supplied by Rohm and Haas (Vinoyl). The coating thickness for this lamination step was 6.5 μm. This lamination, referred to as a triplex lamination, was then allowed to cure for 15 days. A schematic diagram showing the laminate structure as produced is provided in FIG. 3.

Example 6—Heat-Sealable Laminate Film

To produce a heat-sealable laminate film in accordance with the presently-disclosed subject matter, a 50 μm metaphasic biaxially-oriented PET film as described above in Example 1 was first prepared on a commercially suitable production line. Unlike the process described in Example 1, however, the surface of the metaphasic biaxially-oriented PET film was co-extruded with a heat-sealable isophthalate-based copolyester that was a 20% copolymer of ethylene-terephthalate (80%). The isophthalate skin layer thickness was adjusted to give a heat-sealability of the film of approximately 2 kg. Heat-sealability was tested by folding the film over onto itself and sealing the film at 120° C. between heated-jaws at 2.8 bar for 1 second.

The produced film was then taken to an off-line coater/laminator and laminated to 45 μm dead-soft aluminum foil using 5 g dry weight of an adhesive. The adhesive used for this lamination was again the two-part solvent based adhesive supplied by Rohm and Haas as Adcote 11A+Coreactant F. That lamination was then again allowed to cure for 7 days and was subsequently laminated to another portion of the 50 μm metaphasic heat-sealable biaxially-oriented PET film using, once again, the solvent based adhesive as supplied by Rohm and Haas (Adcote 11A/Coreactant F). The resulting lamination was then referred to as a triplex lamination, and was allowed to cure for 15 days. A schematic diagram showing the laminate structure as produced is provided in FIG. 4.

Example 7—Analysis of Laminate PET Film

The laminate PET film produced as described in Example 5 was subjected to standard evaluations for laminated packaging structures. The results of the evaluations of the film produced in accordance with the presently-disclosed subject matter (referred to below as "inventive" or "invention") are shown in Table 5 and Table 6.

TABLE 5

Evaluation of Laminate PET Film.

| PROPERTIES | | UNIT | METHOD | TEST RESULTS | | |
|---|---|---|---|---|---|---|
| | | | | Comparative 1 | Invention | Comparative 2 |
| 13 Puncture Strength | L | N/mm (200 mm/min) | ASTM-D-3763 | 9.29 | 10.10 | 9.28 |
| | | | | 11.23 | 11.57 | 8.53 |
| | C | | | 9.84 | 9.96 | 9.02 |
| | | | | 10.42 | 10.61 | 9.82 |
| | R | | | 9.16 | 9.67 | 8.98 |
| | | | | 10.96 | 10.28 | 9.17 |
| | Min | | | 9.16 | 9.67 | 8.53 |
| | Max | | | 11.23 | 11.57 | 9.82 |
| | Aveg | | | 10.15 | 10.37 | 9.13 |
| 14 Dart Impact | L | (gm/cm$^2$) | ASTM-D-1706 | 710 | 700 | 600 |
| | | | | 700 | 690 | 610 |
| | C | | | 720 | 680 | 610 |
| | | | | 700 | 700 | 620 |
| | R | | | 710 | 710 | 600 |
| | | | | 720 | 720 | 610 |
| | Min | | | 700 | 680 | 600 |
| | Max | | | 720 | 720 | 620 |
| | Aveg | | | 710 | 700 | 608 |

TABLE 6

Summary of Packaging Evaluation of Laminate PET Film.

| Test Type | Material | Puncture | Dart Impact |
|---|---|---|---|
| Comparative Example 1 | 23 μm Biaxially Oriented Nylon Film | 9.14 N/mm | 710 gf/cm^2 |
| Inventive Example | 23 μm Metaphasic Biaxially Oriented PET Film | 9.38 N/mm | 700 gf/cm^2 |
| Comparative Example 2 | 23 μm Biaxially Oriented PET Film | 8.23 N/MM | 609 gf/cm^2 |

As shown in Table 5 and Table 6, the performance of the inventive example is similar to that of traditional biaxially-oriented nylon films. However, a replicate test done on standard biaxially-oriented PET film, i.e. one without metaphasic morphology, showed that unlike the metaphasic PET film, the standard PET film was unsuitable for utilization in formed packaging structures as, for structures in which wells or cavities are created to protect the packaging contents, high impact and puncture resistance are often needed to satisfy the commercially-relevant end-use requirements.

Example 8—End-Use Testing of Laminate PET Films

To evaluate the cold form foil (CFF) processing capabilities of the laminate PET films described herein, the triplex film structures as prepared in Example 5 and Example 6 were subjected to cold forming on equipment typically used to produce blister packaging. Suitable machines are made by Rapid Pack, Pampack, Elmac and other manufactures. Typical converting processes consisted of: a) a cavity pressure of 4-10 pascals; b) a cavity size for the forming of 3 mm to 12 mm; and c) a speed of forming 6 strips per minute with each strip containing 10 cavities. Moreover, in the case of the film of Example 6, the amorphous outer surface of the metaphasic polyester sealant film was coated with Vinoyl 15/45M 5 about 5-6 GSM before processing through the CFF phase.

Subsequent to production, it was observed that the laminates described herein produced a finished product with similar or improved properties to traditional structures comprised of biaxially-oriented nylon films. In this regard, in each of the laminate PET films, the laminate PET films were deemed commercially-suitable on existing CFF processing equipment.

To evaluate the lid sealing capabilities of the laminate PET films described herein, after cold forming, the structures were sealed to a lid. Such a lid could be constructed of many different materials depending on the end-use need. However, for evaluation of the film structures of Examples 5 and 6, a 25 μm hard aluminum foil lid was used that was coated with a water-based heat seal coating provided by Paramelt as Aquaseal AQX2271 or Aquaseal AQX 2203. The coatings were believed to be dispersions of thermoplastic copolyesters, waxes, and fillers, and are well known heat-seal coatings for aluminum foils. As shown Table 7 below, excellent heat-seal properties were observed with the CFF processed webs and sealing the different lid structures.

TABLE 7

Heat Seal Properties of Cold Formed Laminate PET Film.
Aquaseal AQX 2303 & AQX 2271 comparative Seal Strength test report with laminate Trial 1
sample (F-ISB 23 mic/5 gsm SB Adh./40 mic Soft Foil/5 gsm SB Adh./50 mic PVC) & Trial 2
Sample (F-ISB 23 mic/5 gsm SB Adh./40 mic Soft Foil/5 gsm SB Adh./50 mic F-ISB/VMCH Coating)
Ref. No.: CTS/2015-16/F/6
Date: 17 Jun. 2015

| Sr. No. | Sample Refrance | Sealing Condition | | | | | Seal strength with | |
|---|---|---|---|---|---|---|---|---|
| | | Temprature | Pressure | Dwell Time | UNIT | METHOD | Trial 1 sample | Trial 2 sample |
| 1 | AQX 2303 | 180° C. | 40 PSI | 1 Sec | gm/25 mm | Internal | 920-1010 | 1090-1165 |
| 2 | | 180° C. | 40 PSI | 2 Sec | | | 1060-1080 | 1125-1450 |
| 3 | | 190° C. | 40 PSI | 1 Sec | | | 1010-1255 | 1280-1375 |
| 4 | | 190° C. | 40 PSI | 2 Sec | | | 1250-1290 | 1100-1330 |
| 5 | | 200° C. | 40 PSI | 1 Sec | | | 1055-1290 | 1125-1245 |
| 6 | | 200° C. | 40 PSI | 2 Sec | | | 1330-1515 | 1050-1190 |

TABLE 7-continued

Heat Seal Properties of Cold Formed Laminate PET Film.
Aquaseal AQX 2303 & AQX 2271 comparative Seal Strength test report with laminate Trial 1
sample (F-ISB 23 mic/5 gsm SB Adh./40 mic Soft Foil/5 gsm SB Adh./50 mic PVC) & Trial 2
Sample (F-ISB 23 mic/5 gsm SB Adh./40 mic Soft Foil/5 gsm SB Adh./50 mic F-ISB/VMCH Coating)
Ref. No.: CTS/2015-16/F/6
Date: 17 Jun. 2015

| Sr. No. | Sample Refrance | Sealing Condition Temprature | Pressure | Dwell Time | UNIT | METHOD | Seal strength with Trial 1 sample | Trial 2 sample |
|---|---|---|---|---|---|---|---|---|
| 7 | AQX 2271 | 180° C. | 40 PSI | 1 Sec | | | 600-620 | 380-425 |
| 8 | | 180° C. | 40 PSI | 2 Sec | | | 640-670 | 340-420 |
| 9 | | 190° C. | 40 PSI | 1 Sec | | | 950-1015 | 510-590 |
| 10 | | 190° C. | 40 PSI | 2 Sec | | | 900-940 | 630-715 |
| 11 | | 200° C. | 40 PSI | 1 Sec | | | 745-925 | 595-630 |
| 12 | | 200° C. | 40 PSI | 2 Sec | | | 895-985 | 610-660 |

Remarks:
1) Trial 1 sample: F-ISB 23 mic/5 gsm SB Adh./40 mic Soft Foil/5 gsm SB Adh./50 mic PVC
2) Trial 2 sample: F-ISB 23 mic/5 gsm SB Adh./40 mic Soft Foil/5 gsm SB Adh./50 mic F-ISB/VMCH Coating
3) AQX 2271 & AQX 2303 are sealed with Trial 1 sample on PVC side & Trial 2 sample on PVC + Heat seal coating side with above condition.
4) Seal strength value are shows AQX 2303 are gatting better results than AQX 2271 wth high Peel strength.
Observations:
1) With increasing sealing temprature & dwell time seal strength are increased.
2) Seal strength of AQX 2303 with Trial 1 sample and Trial 2 sample are shown comparable value.
3) Seal strength of AQX 2271 with Trial 1 sample are shown higher value than Trial 2 sample.
3) AQX 2303 are showing better results than AQX 2271

Example 9—The Cold Foil Blister Forming Process

The cold foil laminate produced having a PET film or layer on both sides of aluminum foil with the structure 36 μm PET+50 μm foil+36 μm PET is run on a typical cold forming machine, such as the Neo Blister Industry NBM-65. The flow of the laminate, called the forming web, runs on the machine as would be recognized by those skilled in the art. The laminate from the unwinder goes into the die to make the cavity. The cavity is formed by applying pressure, typically between 4 and 6 kg/cm$^2$, and is the typical speed of blister forming is between 20 to 30 blisters per minute. A cavity forming part aids in the formation of the cavity on the laminate films disclosed herein. After the tablet or other object is placed in the cavity on the conveyer, the blister is sealed with temperature and pressure to the lidding foil. Finally, after sealing of the lidding aluminum foil, the blister undergoes the dies and punch action to form the blister pack.

Example 10—Comparative Evaluation of Formable Films

Table 8 provides the results of a comparative evaluation of the properties of several films, including F-UPF/M (metallized polyester) in a 12 μm thickness, F-ISB in 12 μm, 15 μm, 23 μm, and 50 μm thicknesses, F-TFP in 23 μm and 36 μm thicknesses, and BON in 15 μm and 23 μm thicknesses. With respect to the films included in the table below, "BON" is a traditionally manufactured biaxially-oriented Nylon film, "F-ISB" is an isotropic PET film manufactured by Flex Films (USA) Inc. (Elizabethtown, Ky.) and made by traditional biaxial orientation processes, "F-TFP" and "F-ISB" refer to films made in accordance with the presently-disclosed subject matter and including a metaphase, and "F-UPF" is a polyurethane coated biaxially-oriented PET film manufactured by Flex Films (USA) Inc. and made by traditional biaxial orientation processes.

TABLE 8

Table 8. Comparative Evaluation of Film Properties.

| PROPERTIES | | UNIT | METHOD | F-UPF-12 | F-ISB-12μ | F-ISB-15μ | 15μ BON | 23μ BON | F-ISB-23μ | F-TFP-23μ | F-TFP-36μ | F-ISB-50μ |
|---|---|---|---|---|---|---|---|---|---|---|---|---|
| Dimensions (T × W) | | — | — | A4 size sample | 12μ × 1070 mm (UT/CT) | 15μ × 1860 mm (UT/CT) | 15μ × 1000 mm aprox | 23μ × 1000 mm aprox | 23μ × 920 mm (UT/CT) | 23μ × 1000 mm (UT/CT) | 36μ × 920 mm (UT/CT) | A4 size sample |
| Thickness(ByWt) | | micron | STANDARD | 12.1-12.2 | 12.0-12.2 | 14.9-15.4 | 16.00-16.21 | 24.4-25.2 | 23.15-23.70 | 23.95-24.82 | 37.30-39.72 | 49.0-49.2 |
| GSM | | gm/m$^2$ | STANDARD | 16.4-16.8 | 16.8-17.08 | 20.86-21.56 | 18.05-18.30 | 28.45-29.95 | 32.35-32.95 | 32.25-33.10 | 52.22-55.65 | 68.6-68.88 |
| Haze | | % | ASTM-D-1003 | 2.7-2.8 | 3.0-3.2 | 3.4-3.9 | 3.5-3.9 | 2.1-2.3 | 3.9-4.1 | 3.9-4.1 | 7.7-8.3 | 8.1-8.5 |
| Tensile strength | MD | Kg/cm$^2$ | ASTM-D-882 | 2051-2136 | 1794-1805 | 1990-2081 | 2705-2965 | 2410-2485 | 2205-2295 | 2105-2130 | 1958-2233 | 1359-1442 |
| | TD | | | 2193-2209 | 2431-2638 | 2360-2557 | 3130-3200 | 2910-3010 | 2710-2911 | 3095-3170 | 2259-2403 | 1817-2139 |
| Elongation | MD | % | ASTM-D-882 | 140-148 | 147-152 | 154-161 | 145-155 | 201-208 | 204-214 | 260-265 | 211-226 | 177-195 |
| | TD | | | 111-124 | 93-101 | 102-110 | 140-145 | 106-115 | 138-145 | 150-160 | 201-226 | 119-142 |

TABLE 8-continued

Table 8. Comparative Evaluation of Film Properties.

| PROPERTIES | | UNIT | METHOD | F-UPF-12 | F-ISB-12μ | F-ISB-15μ | 15μ BON | 23μ BON | F-ISB-23μ | F-TFP-23μ | F-TFP-36μ | F-ISB-50μ |
|---|---|---|---|---|---|---|---|---|---|---|---|---|
| Youngs Modulus | MD | Kgf/cm² | ASTM-D-882 | 32938-34133 | 39674-40249 | 31260-33043 | 26805-28530 | 30705-37660 | 31065-32920 | 24895-29675 | 28818-29860 | 30889-31491 |
| | TD | | | 41141-42134 | 41162-46303 | 40671-41721 | 20840-24485 | 23465-23195 | 40635-41295 | 42910-45595 | 32022-33024 | 32617-37825 |
| Heat Shrinkage | MD | % | ASTM-D-1204 | 2.8 | 8.3 | 10.5 | 2.0 * | 1.0 * | 7.2 | 5.5 | 8.8 | 1.4-1.6 |
| | TD | | | 0.3 | 5.3 | 6.6 | 2.2 * | 1.5 * | 4.4 | 1.5 | 9.2 | 0.4-0.6 |
| Treatment | one side | Dyne/cm | ASTM-D-2578 | 52 | 46 | 46 | 54 | 52 | 46 | 42 | 46 | 46 |
| | other side | | | 48 | 54 | 54 | 44 | 46 | 54 | 48 | 52 | 48 |
| COF | Static Friction | | ASTM-D-1894 | 0.32 | 0.48 | 0.46 | 0.36 | 0.4 | 0.4 | 0.31 | 0.43 | 0.39 |
| | Kinetic Friction | | | 0.27 | 0.42 | 0.39 | 0.32 | 0.38 | 0.34 | 0.30 | 0.37 | 0.30 |
| W.V.T.R (38° C. & 90% RH) | | gm/m²/day | F-1249 | 45 | 45 | 40 | 420 | 400 | 30 | 30 | 20 | 16 |
| O.T.R. (23° C. & 0% RH) | | cc/m²/day | D-3985 | 130 | 130 | 110 | 30 | 25 | 80 | 80 | 70 | 45 |
| Puncture Strength | L | N/mm (200 mm/min) | ASTM-D-3763 | 5.79 | 6.12 | 7.55 | 5.81 | 9.29 | 10.10 | 8.66 | 10.99 | 23.32 |
| | | | | 6.06 | 6.52 | 8.70 | 6.59 | 11.23 | 11.57 | 9.60 | 11.35 | 21.27 |
| | C | | | 6.47 | 6.63 | 8.62 | 6.32 | 9.84 | 9.96 | 9.12 | 12.05 | 23.17 |
| | | | | 5.80 | 7.12 | 9.62 | 6.80 | 10.42 | 10.61 | 9.76 | 12.59 | 19.07 |
| | R | | | | 7.05 | 8.76 | 6.05 | 9.16 | 9.67 | 8.88 | 11.60 | 19.69 |
| | | | | | 7.38 | 9.56 | 6.15 | 10.96 | 10.28 | 9.26 | 11.96 | 20.49 |
| | Min | | | 5.79 | 6.12 | 7.55 | 5.81 | 9.16 | 9.67 | 8.66 | 10.99 | 19.07 |
| | Max | | | 6.47 | 7.38 | 9.62 | 6.80 | 11.23 | 11.57 | 9.76 | 12.59 | 23.32 |
| | Avg | | | 6.03 | 6.80 | 8.80 | 6.29 | 10.15 | 10.37 | 9.21 | 11.76 | 21.17 |
| Dart Impact | L | (gm/cm²) | ASTM-D-1706 | 270 | 170 | 200 | 140 | 710 | 700 | 540 | 850 | 950 |
| | | | | 270 | 180 | 205 | 400 | 700 | 690 | 560 | 840 | 960 |
| | C | | | 280 | 160 | 190 | 420 | 720 | 680 | 540 | 860 | 940 |
| | | | | 270 | 170 | 200 | 410 | 700 | 700 | 550 | 840 | 950 |
| | R | | | 270 | 160 | 200 | 400 | 710 | 710 | 550 | 860 | 960 |
| | | | | 280 | 170 | 210 | 420 | 720 | 720 | 560 | 850 | 940 |
| | Min | | | 270 | 160 | 190 | 140 | 700 | 680 | 540 | 840 | 940 |
| | Max | | | 280 | 180 | 210 | 420 | 720 | 720 | 560 | 860 | 960 |
| | Avg | | | 273 | 168 | 201 | 365 | 710 | 700 | 550 | 850 | 950 |

Throughout this document, various references are mentioned. All such references are incorporated herein by reference, including the references set forth in the following list:

REFERENCES

1. "Importance of elongational properties of polymer melts for film blowing and thermoforming"; Polymer Engineering & Science Volume 46, Issue 9, pages 1190-1195, September 2006.
2. U.S. Pat. No. 4,073,857, issued Feb. 14, 1978, to Arakawa et al., and entitled "Deep-drawing of a monoaxially oriented, heat relaxed polyester film."
3. U.S. Pat. No. 4,537,312, issued Aug. 27, 1985, to Intini, and entitled Child-Resistant Tamper-Evident Package."
4. U.S. Pat. No. 4,468,426, issued Aug. 28, 1984, to Hatchadoorian et al., and entitled "Adherable reinforced poly (ethylene terephthalate) composite sheet."
5. U.S. Pat. No. 7,128,969, issued Oct. 31, 2006, to Busch et al., and entitled "Method for the production of biologically-degradable packagings made from biaxially-drawn films."
6. U.S. Patent Publication No. 2003/0170479, filed Jun. 13, 2001 by Peiffer et al., entitled White, sealable, thermoformable, biaxially oriented and coextruded polyester film containing a cyclooelfin copolymer, method for producing the same and the use thereof."
7. U.S. Pat. No. 6,902,818, issued Jun. 7, 2005, to Crass et al., and entitled Transparent, UV resistant, thermoformable film made from crystallizable thermoplastics, its use and process for its production."
8. U.S. Pat. No. 5,424,121, issued Jun. 13, 1995, to Murakami, et al., and entitled "Biaxially oriented polyester film."
9. U.S. Pat. No. 3,496,143, to Siggel et al., issued Feb. 17, 1970, and entitled "Process for sheet forming polyethylene terephthalate."

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A film, comprising one or more biaxially-oriented polyethylene terephthalate layers, the film having:
   a metaphase with a metaphase transition present at about 180° C. to about 200° C. as measured by differential scanning calorimetry (DSC) upon a first heating; and
   a molded volume of greater than about 200%.

2. The film of claim 1, wherein the film has a machine direction total elongation percentage of about 180% to about 300%.

3. The film of claim 1, wherein the film has a transverse direction total elongation percentage of about 100% to about 300%.

4. The film of claim 1, wherein the film has a thickness of about 9 μm to about 50 μm.

5. The film of claim 1, wherein the film further comprises an acrylic coating, a polyurethane coating, a polysulphonester coating, or a quaternary ammonium-based coating.

6. The film of claim 1, wherein the metaphase is configured to increase a property of the film selected from the group consisting of tensile strength, drawability, formability, and combinations thereof.

7. The film of claim 1, wherein the film includes:
a machine direction tensile strength of greater than about 2000 kgf/cm at 25° C.;
a transverse direction tensile strength of greater than about 2500 kgf/cm at 25° C.;
a machine direction total elongation percentage measured at 25° C. of greater than about 200%; and/or
a ratio of transverse direction:machine direction tensile strength of greater than about 1.25.

8. The film of claim 1, wherein at least one of the one or more biaxially-oriented polyethylene terephthalate layers is comprised of a polyethylene terephthalate homopolymer or is comprised of polyethylene terephthalate copolyester.

9. The film of claim 1, wherein the film includes at least two biaxially-oriented polyethylene terephthalate layers.

10. The film of claim 9, wherein the film includes three biaxially-oriented polyethylene terephthalate layers.

11. The film of claim 10, wherein at least one of the three biaxially-oriented polyethylene terephthalate layers includes silica.

12. The film of claim 10, wherein the film includes an A/B/A structure comprising a first polyethylene terephthalate layer, a silica-containing polyethylene terephthalate layer, and a second polyethylene terephthalate layer.

13. The film of claim 1, wherein the film has a machine direction tensile strength of greater than about 2000 kgf/cm at 25° C.

14. The film of claim 1, wherein the film has a transverse direction tensile strength of greater than about 2500 kgf/cm at 25° C.

15. The film of claim 1, wherein the film has a machine direction total elongation percentage of greater than about 200% at 25° C.

16. The film of claim 1, wherein the film has a transverse direction total elongation percentage of greater than about 90% at 25° C.

17. A film, comprising one or more biaxially-oriented polyethylene terephthalate layers, the film including a metastable phase having a phase transition temperature of about 50° C. less than the crystalline melting point of the film as measured by differential scanning calorimetry (DSC).

18. The film of claim 17, wherein the film is capable of forming a cavity with little spring-back force.

19. A laminate structure, comprising:
a film including one or more biaxially-oriented polyethylene terephthalate layers, the film having
a metaphase with a metaphase transition present at about 180° C. to about 200° C. as measured by differential scanning calorimetry (DSC) upon a first heating, and
a molded volume of greater than about 200%; and
one or more additional layers laminated to the one or more biaxially-oriented polyethylene terephthalate layers.

20. The laminate structure of claim 19, wherein the metaphase has a phase transition temperature of about 50° C. less than the crystalline melting point of the film as measured by differential scanning calorimetry (DSC).

21. The laminate structure of claim 19, wherein the one or more additional layers are selected from an aluminum foil layer and a polyvinyl chloride layer.

22. The laminate structure of claim 19, wherein the one or more biaxially-oriented polyethylene terephthalate layers comprises a single biaxially-oriented polyethylene terephthalate layer, and wherein the one or more additional layers comprises an aluminum foil layer laminated to the single biaxially-oriented polyethylene terephthalate layer and a polyvinyl chloride layer laminated to the aluminum foil layer.

23. The laminate structure of claim 19, wherein the one or more biaxially-oriented polyethylene terephthalate layers comprises a first biaxially-oriented polyethylene terephthalate layer and a second biaxially-oriented polyethylene terephthalate layer, and wherein the one or more additional layers comprises an aluminum foil layer interposed between the first biaxially-oriented polyethylene terephthalate layer and the second biaxially-oriented polyethylene terephthalate layer.

24. The laminate structure of claim 23, wherein the first biaxially-oriented polyethylene terephthalate layer includes an isophthalate copolyester skin layer.

25. The laminate structure of claim 19, wherein the one or more additional layers are laminated to the one or more biaxially-oriented polyethylene terephthalate layers with an adhesive.

26. The laminate structure of claim 19, wherein the laminate structure has a puncture strength greater than about 9.00 N/mm$^2$.

27. The laminate structure of claim 19, wherein the laminate structure has a dart impact strength greater than about 650 g/cm$^2$.

* * * * *